(12) United States Patent
Wan et al.

(10) Patent No.: US 7,077,991 B2
(45) Date of Patent: Jul. 18, 2006

(54) NANOCOMPOSITES OF SILICON NITRIDE, SILICON CARBIDE, AND BORON NITRIDE

(75) Inventors: Julin Wan, Schenectady, NY (US); Amiya K. Mukherjee, Davis, CA (US); Matthew J. Gasch, Sacramento, CA (US)

(73) Assignee: The Regents of the University of California, Oakland, CA (US)

( * ) Notice: Subject to any disclaimer, the term of this patent is extended or adjusted under 35 U.S.C. 154(b) by 58 days.

(21) Appl. No.: 10/773,758

(22) Filed: Feb. 6, 2004

(65) Prior Publication Data

US 2005/0173840 A1 Aug. 11, 2005

(51) Int. Cl.
*B22F 1/00* (2006.01)
*C04B 35/52* (2006.01)
*B29C 35/12* (2006.01)

(52) U.S. Cl. ............... 264/405; 264/332; 264/682; 264/683

(58) Field of Classification Search ............... 264/405, 264/332, 430, 434, 682, 683; 501/91–93
See application file for complete search history.

(56) References Cited

U.S. PATENT DOCUMENTS

| 5,039,632 | A |   | 8/1991  | Riedel et al.              |
|-----------|---|---|---------|----------------------------|
| 5,134,097 | A | * | 7/1992  | Niihara et al. ...... 501/92 |
| 5,386,006 | A | * | 1/1995  | Matsumoto et al. ..... 264/434 |
| 5,424,126 | A |   | 6/1995  | Tibbetts et al.            |
| 5,914,286 | A | * | 6/1999  | Collin et al. ...... 501/97.4 |
| 6,025,454 | A |   | 2/2000  | Sneddon et al.             |
| 6,242,626 | B1|   | 6/2001  | Eiling et al.              |
| 6,478,994 | B1|   | 11/2002 | Sneddon et al.             |

OTHER PUBLICATIONS

Wan et al. Silicon Nitride-silicon Carbide Nanocomposites Fabricated by Electric-field-Assisted Sintering, J. Am. Ceram. Society, vol. 86, issue 3, Mar. 2003, pp. 526-528.*
Guo-Dong et al. Alumina-Based Nanocomposites Consolidated by Spark Plasma Sintering, Scripta Materialia, Dec. 2002, vol. 47 Issue 11, pp. 737-741. Abstract only.*
Wan et al. Effect of Ammonia Treatment on the Crystallization of Amorphous Silicon-Carbon-Nitrogen Ceramics Derived from Polymer Precursor Pyrolysis, J. Am. Ceram. Society, vol. 85, Issue 3, 2002, pp. 554-564.*
Butchereit, Eike et al.; "Precursor-Derived SI-B-C-N Ceramics: Oxidation Kinetics"; *J.Am. Ceram. Soc.*, 2001, vol. 84, No. 10, pp. 2184-2188.
Christ, Martin et al.; "High-Temperature Mechnical Properties of Si-B-C-N-Precursor-Derived Amorphous Ceramics and the Applicability of Deformation Models Developed for Metallic Glasses"; *J.Am. Ceram. Soc.*, 2000, vol. 83, No. 12, pp. 3025-3032.
Christ, Martin et al.; "Anelastic behavior of precursor-derived amorphous ceramics in the system Si-B-C-N"; *J. Mater. Res.*, 2001, vol. 16, No. 7, pp. 1994-1997.
Funayama, Osamu et al.; "Synthesis of a Polyborosilazane and its Conversion into Inorganic Compounds"; *J.Am. Ceram. Soc.*, 1993, vol. 76, No. 3, pp. 717-723.
Liew, Li-Anne et al.; "Ceramic MEMS: New Materials, Innovative Processing and Future Applications"; *American Ceramic Society Bulletin*, 2001, vol. 80, No. 5, pp. 25-30.
Loffelholz, Josue et al.; "Novel Access to Polyboro- and Polyalumosilazanes Suitable as Precursors for Ternary Nitride Ceramics"; *Adv. Mater.*, 1995, vol. 7, No. 3, pp. 289-292.
Ramakrishnan, P.A. et al.; "Silicoboron-carbonitride ceramics: A class of high-temperature, dopable electronic materials"; *Applied Physics Letters*, 2001, vol. 78, No. 10, pp. 3076-3078.
Riedel, Ralf et al.; A silicoboron carbonitride ceramic stable to 2,000° C: *Nature*, 1996, vol. 382, pp. 796-798.
Seyferth, Dietmar et al.; "Borasilazane Polymeric Precursors for Borosilicon Nitride"; *J.Am. Ceram. Soc.*, 1990, vol. 73, No. 7, pp. 2131-2133.
Wan, Julin et al.; "In Situ Densification Behavior in the Pyrolysis Consolidation of Amorphous Si-N-C Bulk Ceramics from Polymer Precursors"; Journal of the American Ceramic Socirty, 2001, vol. 84, No. 10, 1 page abstract.
Wang, Zhi-Chang et al.; "Novel Silicon-Boron-Carbon-Nitrogen Materials Thermally Stable up to 2200° C"; *J.Am. Ceram. Soc.*, 2001, vol. 84, No. 10, pp. 2179-2183.
Weinmann, Markus et al.; "Synthesis and Thermal Behavior of Novel Si-B-C-N Ceramic Precursors"; *Chem. Mater.*, 2000, vol. 12, pp. 623-632.

* cited by examiner

*Primary Examiner*—Carlos Lopez
(74) *Attorney, Agent, or Firm*—M. Henry Heines; Townsend and Townsend and Crew, LLP

(57) ABSTRACT

Densified composites of silicon nitride, silicon carbide, and boron nitride that exhibit high creep resistance are obtained by sintering a mixture of amorphous powders of silicon nitride, silicon carbide, and boron nitride in the presence of an electric field under high pressure. The grain size in the resulting composite is less than 100 nanometers for all components of the composite, and the composite exhibits high creep resistance.

18 Claims, No Drawings

NANOCOMPOSITES OF SILICON NITRIDE, SILICON CARBIDE, AND BORON NITRIDE

STATEMENT AS TO RIGHTS TO INVENTIONS MADE UNDER FEDERALLY SPONSORED RESEARCH AND DEVELOPMENT

This invention was made with United States Government support under Contract No. N00014-00-1-0186, awarded by the Office of Naval Research. The Federal Government has certain rights in this invention.

BACKGROUND OF THE INVENTION

1. Field of the Invention

This invention lies in the field of ceramics that are composites of silicon nitride, silicon carbide, and boron nitride, and relates in particular to methods for preparing high-density, high-strength, creep-resistant materials of these composites.

2. Description of the Prior Art

Ceramics that are composites of silicon nitride, silicon carbide, and boron nitride are used in a variety of applications, ranging from microelectromechanical devices to rocket re-entry vehicles in the aerospace industry. These composites offer high thermal stability and high resistance to oxidation, characteristics that are highly desirable for miniature high-speed high-precision devices such as nanoturbines as well as load-carrying structural surfaces that are exposed to extremely high temperatures during use.

These composites have been prepared in the prior art by the pyrolysis of hybrid organic/inorganic precursors, including mixtures of polycarbosilanes and polymeric boron-containing carbosilanes, to achieve amorphous powders that are then densified by methods such as hot-pressing, gas-pressure sintering, and hot isostatic pressing. The microstructures of the composites produced by these methods generally consist of micron-sized or sub-micron-sized crystalline grains with inclusions of nano-sized crystals of silicon nitride dispersed through the larger grains. The term "micron-sized or sub-micron-sized" refers to grains having diameters that are greater than 100 nm, particularly 150 nm or above, while the term "nano-sized" refers to grains whose diameters are substantially less than 100 nm, particularly 50 nm or below. To increase the densification that occurs during these procedures, densification aids have been added to the amorphous powder mixture. The densification aids are metal oxides that are liquid at the sintering temperature, examples of which are magnesium oxide (MgO), alumina ($Al_2O_3$), yttria ($Y_2O_3$), lithium oxide ($LiO_2$), and ceria ($CeO_2$) and other rare earth oxides. Alumina, yttria, and combinations of alumina and yttria are the most common densification aids.

While densification aids help to produce composites of greater density, they also produce a glassy phase at the grain boundaries and interfaces. The glass flows at a temperature lower than the melting temperatures of the grains themselves, and this introduces creep, i.e., the tendency of adjacent grains to move relative to each other, which is detrimental to the structural stability of the material.

The present invention seeks to address these problems by providing a method for producing a highly dense silicon nitride/silicon carbide/boron nitride composite that exhibits at most an extremely low tendency toward creep.

SUMMARY OF THE INVENTION

It has now been discovered that composites of silicon nitride, silicon carbide and boron nitride (Si—C—B—N) can be densified by a process that avoids the use of densification aids entirely or uses a much reduced quantity (at most about 1% by weight) of densification aid, and yet achieves a density comparable to that obtained with the metal oxide densification aids of the prior art while sharply reducing the creep behavior observed in composites of the prior art. This result is achieved by forming a powder mixture of silicon nitride, silicon carbide, and boron nitride, all preferably amorphous, in an inert environment, subjecting the mixture to mechanical activation by high-energy ball milling, then consolidating and densifying the powder mixture by electric field-assisted sintering, also known as spark plasma sintering. The process results in a composite whose microstructure consists of silicon nitride grains and silicon carbide grains, all crystalline and all nano-sized, surrounded by crystalline nano-sized shells or layers of boron nitride, and essentially no glassy phase or, if a glassy phase is indeed present, one whose proportions are too small to contribute significantly to the creep behavior of the composite. These and other objects, features, and advantages of the invention will be apparent from the description that follows.

DETAILED DESCRIPTION OF THE INVENTION AND PREFERRED EMBODIMENTS

Powder mixtures of silicon nitride, silicon carbide, and boron nitride that are to be subjected to mechanical activation and electric field-assisted sintering in the practice of this invention are preferably prepared by the pyrolysis of polymeric precursors that contain silicon, carbon, nitrogen, boron, and hydrogen, or by hydrolysis of a mixture of a polymeric precursor that contains silicon, carbon, nitrogen, and hydrogen and a boron-containing non-polymeric material.

Examples of suitable polymeric precursors are polyorganosilazanes, which can be substituted with boron by reaction with a borane that contains at least one B—H bond. Various classes of polyorganosilazanes are disclosed in the following U.S. patents, each of which is incorporated herein by reference in its entirety:

Schwark (Hercules Incorporated, assignee), U.S. Pat. No. 4,929,704, issued May 29, 1990
Schwark (Hercules Incorporated, assignee), U.S. Pat. No. 5,001,090, issued Mar. 19, 1991
Schwark (Hercules Incorporated, assignee), U.S. Pat. No. 5,021,533, issued Jun. 4, 1991
Schwark (Hercules Incorporated, assignee), U.S. Pat. No. 5,032,649, issued Jul. 16, 1991
Schwark (Hercules Incorporated, assignee), U.S. Pat. No. 5,155,181, issued Oct. 13, 1992

Further descriptions are found in the following publications available on the Internet at www.kioncorp.com, each of which is also incorporated herein by reference:

"KiON™ Polysilazanes—Hybrid Inorganic/Organic Resin Systems," KiON Corporation, New York, N.Y., USA, Apr. 2, 2001
"KiON™ VL20 and CERASET™ Liquid Polysilazanes—General Technical Bulletin," KiON Corporation, New York, N.Y., USA, Apr. 2, 2001

These polymers are liquid and are generally characterized by repeat units with alternating silicon and nitrogen atoms. Some of these polymers further contain urea or thiourea functionalities in the repeat units, and in some cases the repeat units are cyclic while others have acyclic repeat units. One preferred polyorganosilazane is CERASET™ SN, whose formula is shown below:

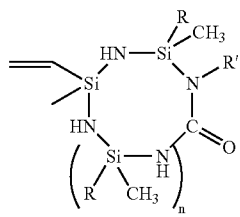

in which R and R' independently represent either a hydrogen atom or a vinyl group and n ranges from 1 to 20. Another preferred polyorganosilazane is KiON™ VL20 whose structure is similar to that of CERASET™ SN but lacks the urea functionalities. These polymers are available from KiON International, Columbus, Ohio, USA.

Boranes that can be reacted with these polyorganosilazanes to obtain boron-substituted polymers include those of any of the following formulas RR'BH, RBH$_2$, and BH$_3$.L, in which R and R', which may the same or different, are either $C_1$–$C_{10}$ alkyl, aryl, $C_2$–$C_6$ alkenyl, or $C_2$–$C_6$ alkynyl, and L is a Lewis base donor. Examples of Lewis base donors are pyridine, ammonia, t-butylamine, dimethylamine, methyl sulfide, and trimethylamine. Suitable examples of boranes thus include decaborane, pentaborane, diborane, and various complexes of borane with any of these Lewis bases. Decaborane is preferred, and while decaboranes include both $B_{10}H_{14}$ and $B_{10}H_{16}$, the most preferred decaborane is $B_{10}H_{14}$. The boranes referred to in this paragraph are known in the art and available either through commercial suppliers or by synthesis methods that are likewise known in the art. Hydroboration of the polyorganosilazane with these boranes is achieved by known methods, which preferably include combining the powdered or liquid borane with the polyorganosilazane, which is typically a liquid, and reacting these materials in an inert atmosphere at a moderate temperature of less than 100° C.

The boron-substituted polyorganosilazanes thus prepared are first crosslinked to solid form, then comminuted to a powder in the micron-size range, i.e., having a particle diameter in excess of 1 micron. Crosslinking is achieved by methods described in the patents and reference documents cited above, preferably with the assistance of a peroxide crosslinking catalyst. Comminution of the amorphous mass to a powder is accomplished by conventional methods such as grinding, ball milling, planetary milling or the like. The comminuted powder is then pyrolized to an amorphous Si—C—B—N solid, using procedures and conditions that are also set forth in the patents and documents referenced above, typically by heating to a temperature in excess of 1,000° C. for several hours in an inert atmosphere. All steps described in this paragraph are preferably performed in an inert atmosphere such as nitrogen or argon to avoid or minimize the presence or formation of silicon dioxide.

The relative amounts of silicon, carbon, nitrogen, and boron in the powder mixture can vary, although some variation in properties may result as the proportion of any one element is raised or lowered. Such variations are within the expectations of those skilled in the art. For the purposes of this invention, best results will be obtained when the relative amounts are about 10 to about 60 parts by volume silicon, from about 10 to about 60 parts by volume carbon, from about 10 to about 60 parts by volume nitrogen, and from about 2 to about 30 parts by volume boron, to total 100 parts by volume of the powder mixture. Preferred ranges are about 10 to about 30 parts by volume silicon, about 10 to about 30 parts by volume carbon, about 25 to about 50 parts by volume nitrogen, and about 2 to about 10 parts by volume boron. The volumes used in determining these parts by volume are calculated from the weight percents of the individual elements and their theoretical densities.

The amorphous Si—C—B—N powder mixture thus obtained is mechanically activated by high-energy ball milling. This is likewise achieved by methods known in the art and is typically performed in oscillating, centrifugal, and/or planetary mills that apply oscillating, centrifugal, and/or planetary action to the powder mixture with the assistance of grinding balls. Acceleration of up to 20 g (20 times the acceleration due to gravity) occurs in these mills to activate the amorphous powder particles and reduce their size to micron-size range, typically a range of approximately 10 to 20 microns. Variables such as the sizes of the milling balls, the number of milling balls used per unit volume of powder, the rotation speed of the mill, the temperature at which the milling is performed, and the length of time that milling is continued can vary widely. The resulting powder may also be affected by the "charge ratio," which is defined as the ratio of the mass of the milling balls to the mass of the powder. A charge ratio of at least about 10:4, preferably from about 10:1 to about 20:1, and most preferably about 12:1 to about 16:1, will generally provide the best results. A further process variable is the cycle frequency of the ball mill, expressed as impacts per second (two impacts per cycle). Preferred procedures are conducted at a frequency of 6 or more impacts per second, preferably 6 to 50 impacts per second.

Electric field-assisted sintering is performed by passing a pulsewise DC electric current through the powder mixture while pressure is applied. A description of this method and of apparatus in which the method can be applied is presented by Wang, S. W., et al., "Densification of $Al_2O_3$ powder using spark plasma sintering," *J. Mater. Res.* 15(4), 982–987 (2000), such description being incorporated herein by reference. While the conditions may vary, best results will generally be obtained with a densification pressure exceeding 10 MPa, preferably of from about 10 MPa to about 200 MPa, and most preferably from about 40 MPa to about 100 MPa. Likewise, the preferred current is a pulsed DC electric current of from about 1,000 A to about 10,000 A, most preferably from about 1,500 A to about 5,000 A. Preferred temperatures are within the range of from about 900° C. to about 3,000° C., and most preferably from about 1,000° C. to about 2,000° C. Densification by isostatic compression is typically performed under an atmosphere of inert gas, and preferred gas pressures of about 10 Torr or below, and most preferably from about 1.0 Torr or below. The electric field-assisted sintering converts the particles from amorphous form to crystals in the nano-size range.

As noted above, one or more densification aids, typically metal oxides, may be included in the powder mixture during densification, but a high-density product will still be obtained without densification aids. If one or more densification aids are present, their concentrations are preferably no greater than 1%, more preferably no greater than 0.5%, and most preferably no greater than 0.1%, all by weight based on the weight of the total powder mixture. The final density of the product, expressed as a percent of theoretical density, can vary depending on the sintering conditions that are applied.

Preferred products are those with a density that is 95% or greater, more preferred are those with a density of 98% or greater, and most preferred are those with a density of 99% or greater.

In this specification and the appended claims, the term "micron-sized" refers to grains or particles having diameters greater than 1 micron on the average, the term "sub-micron-sized" refers to diameters (again on the average) within the range of 100 nm to 1,000 nm, preferably 150 nm or above, and the term "nano-sized" refers to diameters (again on the average) that are less than 100 nm, preferably 50 nm or less.

The following example is offered for purposes of illustration and is not intended to limit the scope of the invention.

EXAMPLE

CERASET SN Inorganic Polymer as referenced above was combined with decaborane purchased from Alfa Aesar Inc., Ward Hill, Me., at decaborane:polyorganosilazane weight ratios ranging from 2:98 to 20:80, in a nitrogen-filled container where the mixture was stirred at 60° C. for four hours. The mixture was then crosslinked with 0.5–2 weight percent peroxide catalyst by heating at 400° C. for two hours. The crosslinked polymer was then pulverized by ball milling for 24 hours in a nitrogen atmosphere to produce powders of 200 mesh particle size (74 microns). The powders were then pyrolyzed at 1450° C. for 4 hours in flowing nitrogen to produce amorphous Si—C—B—N.

The pyrolyzed powders were then placed in silicon nitride milling jars together with milling balls of silicon nitride 14 mm in diameter, at a charge ratio of approximately 10:4. The milling jars were placed on high-energy milling equipment consisting of a SPEX 8000 Mixer/Mill manufactured by SPEX CertiPrep Industries Inc., Metuchen, N.J., USA, and milling was performed at an energy level of approximately 20 impacts per second over a period of 24 hours. The powders were reduced during the milling operation to a mean particle size within the range of about 10 to 20 microns.

The milled powder mixtures were then individually sintered by electric field-assisted sintering, using a Dr. Sinter 1050 spark plasma sintering system (Sumitomo Coal Company, Japan) in vacuum. The samples were about 4.8 g in weight, and sintering was conducted using 18 kN (63 MPa) of uniaxial force and an electric square wave pulse cycle of 12 cycles on and 2 cycles off with a cycle time of about 3 ms. During the sintering cycle, the samples were heated to 600° C. in two minutes, and then heated at a rate of 100–200° C./min to 1,600° C. and held at that temperature for 10–30 minutes, as detected by an optical pyrometer focused at the outside of the graphite die.

The sintered compacts were removed from the sintering apparatus and analyzed. Densities were determined by the Archimedes method using deionized water as the immersion medium. The densities thus obtained were in the range of 2.8 to 3.0 g/cc. In other tests, the crystalline phases present were determined by x-ray diffraction using CuKα radiation. The microstructure, i.e., the mapping of the elemental locations of the Si, C, B, and N atoms, the phase distribution, and the grain sizes were in the nano-size range, generally from about 30 to about 50 nm in diameter, as determined by electron energy loss microscopy. The grain boundaries, including the presence and absence of the inter-grain glassy phase, were analyzed by high resolution transmission microscopy. Creep resistance determinations were made under uniaxial constant stress, using a computer-interfaced, pneumatic-load test frames at 1350–1450 EC in air. A stepwise protocol was used, starting at 50 MPa. When steady state was reached, as indicated by a constant creep rate for secondary creep, the stress was increased in steps of 50 MPa and the secondary creep rate measured at each stress level. The creep testing revealed a creep rate an order of magnitude lower than that of samples that have undergone identical processing except for the addition of boron. The non-boron samples achieved the low rate or $6.67 \times 10^{-11}$ per second at 1,400° C. and 50 MPa.

The foregoing is offered for purposes of illustration and explanation. Further variations, modifications and substitutions that, even though not disclosed herein, still fall within the scope of the invention may readily occur to those skilled in the art.

What is claimed is:

1. A method for forming a dense Si—C—B—N composite, said method comprising:
    (a) mechanically activating a powder mixture comprised of silicon nitride, silicon carbide, and boron nitride; and
    (b) consolidating said powder mixture so activated into a continuous mass by compressing said powder mixture so activated in the presence of 0 to 1% by weight of metal oxide densification aids relative to said powder mixture, while passing an electric current through said powder mixture, to achieve a fused Si—C—B—N mass comprised of crystals less than 100 nanometers in diameter.

2. The method of claim 1 wherein said powder mixture of step (a) is substantially amorphous.

3. The method of claim 1 wherein said crystals of said fused Si—C—B—N mass are less than 50 nm in diameter.

4. The method of claim 1 wherein any metal densification aid present in step (b) is from 0 to 0.5% by weight of said powder mixture of step (b).

5. The method of claim 1 wherein any metal densification aid present in step (b) is from 0 to 0.1% by weight of said powder mixture of step (b).

6. The method of claim 1 wherein step (b) is performed in the absence of metal oxide densification aids.

7. The method of claim 1 wherein said powder mixture of step (a) consists essentially of from about 10 to about 60 parts by volume silicon, from about 10 to about 60 parts by volume carbon, from about 10 to about 60 parts by volume nitrogen, and from about 2 to about 30 parts by volume boron, based on a total of 100 parts by volume of said powder mixture of step (a).

8. The method of claim 1 further comprising forming said powder mixture of step (a) by combining decaborane with a polyorganosilazane, followed by crosslinking and pyrolysis.

9. The method of claim 8 wherein said polyorganosilazane is a polyureasilazane.

10. The method of claim 1 wherein step (b) comprises compressing said powder mixture so activated at a pressure of about 10 MPa to about 200 MPa and a temperature of about 900° C. to about 3,000° C., and said electric current is a pulsed direct current of about 1,000 A/cm$^2$ to about 10,000 A/cm$^2$.

11. The method of claim 10 wherein said pressure is about 40 MPa to about 100 MPa.

12. The method of claim 10 wherein said temperature is about 1,000° C. to about 2,000° C.

13. The method of claim 10 wherein said pulsed direct current is about 1,500 A/cm$^2$ to about 5,000 A/cm$^2$.

14. The method of claim 1 wherein step (b) is performed to achieve a fused mass with a density of at least 95% relative to a volume-averaged theoretical density.

15. The method of claim 1 wherein step (b) is performed to achieve a fused mass with a density of at least 98% relative to a volume-averaged theoretical density.

16. The method of claim 1 wherein step (b) is performed to achieve a fused mass with a density of at least 99% relative to a volume-averaged theoretical density.

17. The method of claim 1 wherein step (a) comprises milling said powder mixture by high-energy ball milling.

18. The method of claim 17 wherein said high-energy ball milling is performed with silicon nitride milling balls in an oscillating mill at about 6 or more impacts per second and a charge ratio of at least about 10:4.

* * * * *